United States Patent [19]

Brasier

[11] 4,337,994
[45] Jul. 6, 1982

[54] LINEAR BEAM SCANNING APPARATUS ESPECIALLY SUITABLE FOR RECORDING DATA ON LIGHT SENSITIVE FILM

[75] Inventor: Robert E. Brasier, Carlsbad, Calif.

[73] Assignee: Datagraphix, Inc., San Diego, Calif.

[21] Appl. No.: 160,605

[22] Filed: Jun. 18, 1980

[51] Int. Cl.³ .............................................. G02B 27/17
[52] U.S. Cl. .................................................... 350/3.71
[58] Field of Search ........................................ 350/3.71

[56] References Cited

U.S. PATENT DOCUMENTS

| | | | |
|---|---|---|---|
| 2,267,544 | 12/1941 | Wente | 350/190 X |
| 2,323,607 | 7/1943 | Kellogg | 350/190 X |
| 3,345,120 | 10/1967 | Palmer | 350/190 X |
| 3,492,469 | 1/1970 | Silverman | 356/71 |
| 3,505,658 | 4/1970 | Fan et al. | 250/578 X |
| 3,609,002 | 9/1971 | Fraser et al. | 250/578 X |
| 3,614,193 | 10/1971 | Beiser | 350/7 |
| 3,619,033 | 11/1971 | McMahon | 350/3.71 |
| 3,630,594 | 12/1971 | Gorog | 350/3.71 |
| 3,787,107 | 1/1974 | Sick et al. | 350/7 |
| 3,801,180 | 4/1974 | Maguire et al. | 350/190 X |
| 3,877,777 | 4/1975 | Glenn, Jr. | 350/7 |
| 3,922,059 | 11/1975 | Noguchi | 350/7 X |
| 3,940,202 | 2/1976 | Kato et al. | 350/7 |
| 3,951,509 | 4/1976 | Noguchi et al. | 350/3.71 |
| 4,056,307 | 11/1971 | Rayces | 350/181 |
| 4,084,197 | 4/1978 | Starkweather | 358/300 |

OTHER PUBLICATIONS

Cindrich, Ivan, "Image Scanning by Rotation of a Hologram", Applied Optics, vol. 6, No. 9, Sep. 1967, pp. 1531-1534.

Primary Examiner—John K. Corbin
Assistant Examiner—Bruce Y. Arnold
Attorney, Agent, or Firm—Flehr, Hohbach, Test, Albritton & Herbert

[57] ABSTRACT

A linear beam scanning apparatus especially suitable for recording data on light sensitive film is disclosed herein. This apparatus starts with a modulated beam of collimated light and utilizing a suitable device, preferably a holographic grating scanner, converts this stationary beam to a first continuously scanning beam of light having a particular cross-sectional segment thereof which repeatedly moves, that is scans, from a first point to a second point along an arcuate path. This arcuately scanning beam is then converted by optical means to a second continuously scanning beam which converges to a point and which repeatedly moves, that is scans, from one end of a straight line path to its other end.

15 Claims, 13 Drawing Figures

LINEAR BEAM SCANNING APPARATUS ESPECIALLY SUITABLE FOR RECORDING DATA ON LIGHT SENSITIVE FILM

The present invention relates generally to beam scanning techniques and more particularly to a linear beam scanning apparatus especially suitable for recording data on light sensitive film such as microfilm or microfiche.

There are presently many known methods of recording data on photo-sensitive materials using a modulated beam of light. Most, if not all, of these methods use one kind of device or another for scanning a modulated beam, preferably in a linear fashion. Some devices employ acousto-optic techniques and others use rotary polyhedral mirrors, prisms or electromagnetic tape vibrating mirrors. Yet others have utilized electromagnetic resonance-type vibrating mirrors, e.g., galvanometers or acousto-optic modulators.

Still another beam scanning technique suggested heretofore utilizes a rotating grating or hologram first discussed in an article by Ivan Cindrich entitled IMAGE SCANNING BY ROTATION OF A HOLOGRAM, which appeared in *Applied Optics*, Vol. 6, No. 9, September, 1967. In this article, Cindrich describes a disc-like hologram which can be rotated in the path of a fixed light beam for converting the latter, that is the first-order image of the latter, into a beam which scans a circular path. The Cindrich article also briefly touches on the utilization of its disclosed hologram to obtain linear scanning, although there is not a detailed discussion on exactly how this is to be attained. Moreover, while Cindrich discusses, in his article, the beam forming and deflection principles of the hologram, there is no specific discussion of any real optical systems that would help make the technique practical.

Since publication of the Cindrich article just recited, there have been numerous patents on systems and techniques using his holographic scanning principles, such that the latter is now well known in the art. Most of these techniques have used reflection holograms while a few have used transmission type holograms. All of the holographic scan devices which have been reviewed by the applicant have used complicated grating patterns designed to either focus the light beam as with a hololens along with scanning the beam, or have used varying spatial frequency patterns arranged on the scanner so that a straight line scan is obtained as a result of the special grating pattern itself. Typical and most publicized of the patented holographic scanners are the ones described in U.S. Pat. No. 3,614,193. In this patent, the holofacets are formed on a spherical surface and the grating pattern functions as a hololens. The incident laser light is reflected and is focused by diffraction from the special holofacet patterns on the scanner. As the scanner turns, the focused point correspondingly scans through an arc. Because this holographic method uses reflected light, it is subject to much lower diffraction efficiencies than can be obtained by conforming to the Bragg angle conditions for thick transmission gratings. This type of holographic scanner requires high precision in mounting the rotating element so that eccentricity and bearing run out errors will not effect the scan accuracy. The scan element itself is not easily fabricated for the facet surface is curved and the surface must be exposed, etched and made highly reflective. The setup for exposing the required grating pattern also requires high precision to obtain the duplication accuracy needed.

Some transmission gratings use special holographic grating patterns on flat discs that focus the laser beam at the same time that the grating rotation imparts scanning motion to the beam. An example of this is described in U.S. Pat. No. 3,940,202. There a system is disclosed which causes a beam to scan a straight line by means of a special holographic pattern recorded on a disc that is rotated. The disc includes a plurality of facets and the pattern in each facet consists of a changing spatial frequency. This required pattern is often complex and hard to fabricate accurately.

Still another version of a transmission holographic scanner uses a transparent cylinder on the surface of which is photographed facets having a variable frequency across each facet. A laser beam incident on the inside of the cylinder is caused to diffract through a varying angle as the cylinder is rotated. The cylindrical scanner, while producing a scan that lies in a plane is expensive and difficult to manufacture, especially with the emmulsion and exposure having to be applied around its periphery. In addition, all of the scanners using focusing or scanning grating patterns are sensitive to mechanical errors of mounting and bearing run out. They are also difficult to fabricate because of the special grating patterns required. The problem of trying to make all facets uniform to one another in terms of diffraction efficiency at all points of the scan is hard to overcome with the exposure techniques that are required.

In view of the foregoing, one object of the present invention is to provide an uncomplicated, reliable and yet relatively economical apparatus for providing a linear beam scanning apparatus and specifically one which is suitable for use in recording data on light sensitive film, especially microfilm or microfiche.

Another object of the present invention is to provide a linear beam scanning apparatus which utilizes a rotating hologram disc, specifically a disc which contains holographic grating facets, without the drawbacks described above.

A more specific object of the present invention is to provide a linear beam scanning apparatus which first converts a fixed beam of light into an arcuately scanning beam and then converts the arcuately scanning beam into a linearly scanning beam, each in an uncomplicated and reliable manner.

Another specific object of the present invention is to utilize an uncomplicated hologram disc, particularly one which does not require complicated grating patterns or varying spatial frequency patterns, for converting a fixed beam of light to an arcuately scanning beam in an apparatus of the type recited immediately above.

Still another specific object of the present invention is to provide a stationary optical technique for converting the arcuately scanning beam just recited into a linearly scanning beam and particularly a technique which is uncomplicated in its design, which provides accurate linear scanning and which is relatively economical to provide.

A further object of the present invention is to provide a linear beam scanning apparatus operating on an initially provided beam modulated in a predetermined way and specifically an apparatus which includes an uncomplicated, reliable and economical technique for synchronizing the way the beam is modulated with the way in which it scans in order to accurately record the resultant data.

Still a further object of the present invention is to provide a linear beam scanning apparatus which provides both telecentric line scanning and telecentric raster scanning in an uncomplicated manner.

As will be described in more detail hereinafter, the linear beam scanning apparatus disclosed herein is one which utilizes a source of light initially producing a stationary or fixed beam. This apparatus also includes means such as a readily provided and uncomplicated rotating holographic disc to act on the stationary beam for producing therefrom a first continuously arcuately scanning input beam of light, that is a beam having a particular cross-sectional segment thereof which repeatedly moves from a first point to a second point along an arcuate path. In accordance with one aspect of the present invention, means are also provided to act on the arcuately scanning beam for producing therefrom a continuously linearly scanning output beam of light, that is a beam having a particular cross-sectional segment thereof which repeatedly moves from a first point to a second point along a straight line path.

The more detailed aspects of this apparatus which enable it to meet the objects discussed above will be described more fully hereinafter in conjunction with the drawings wherein.

Figures 1, 2, 3, 4, 5:
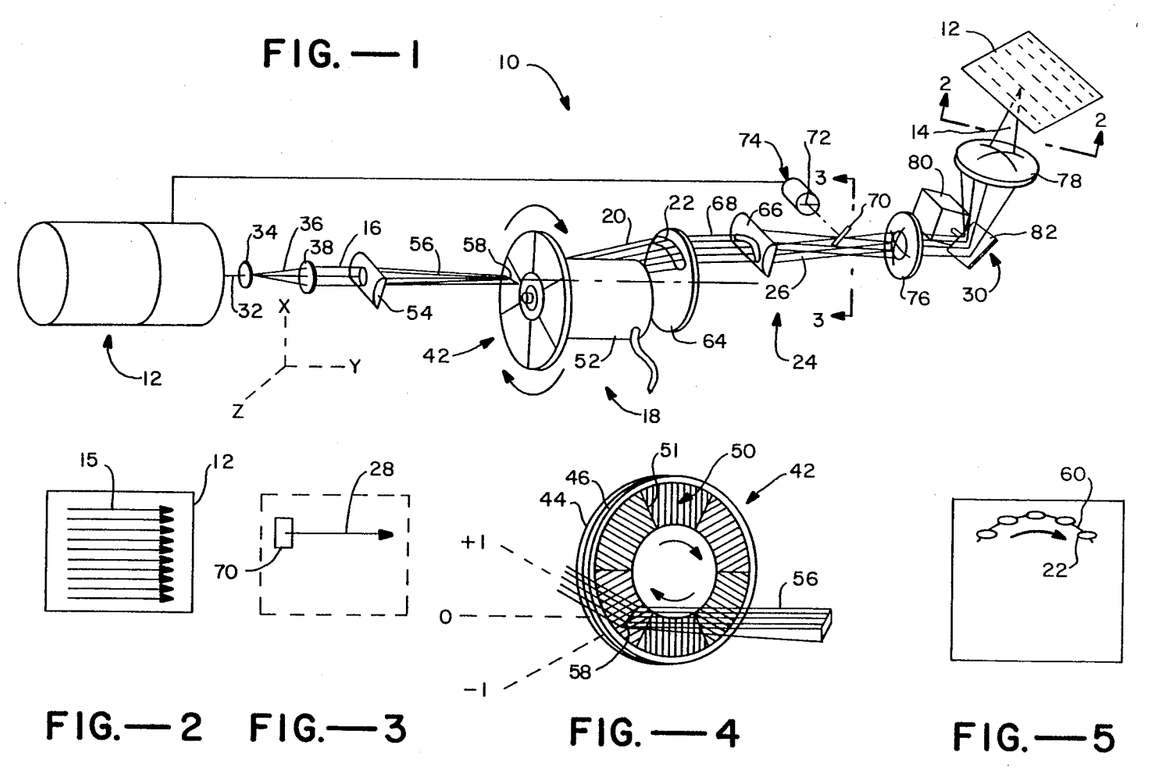
FIG. 1 diagrammatically illustrates in perspective view a linear beam scanning apparatus which is especially suitable for recording data on a light sensitive film and which is designed in accordance with the present invention.
FIG. 2 is a sectional view of the apparatus of FIG. 1 taken generally along line 2—2 in FIG. 1.
FIG. 3 is a sectional view of the apparatus of FIG. 1, taken generally along line 3—3 in FIG. 1.
FIG. 4 is a perspective view of a flat scan disc of a holographic grating facet utilized in the apparatus of FIG. 1.
FIG. 5 diagrammatically illustrates how the disc of FIG. 4 operates to provide an arcuately scanning beam of light.

Turning now to the drawings, wherein like components are designated by like reference numerals throughout the various figures, attention is first directed to FIG. 1 which illustrates a linear beam scanning apparatus designed in accordance with the present invention and generally designated by reference numeral 10. As will be seen hereinafter, apparatus 10 is especially suitable for recording data on a light sensitive film generally indicated at 12, and accomplishes this by producing at its output a continuously scanning, modulated beam of light 14. As seen best in FIG. 2, this beam successively scans a series of vertically aligned, parallel lines 15 starting at the beginning of the uppermost line on film 12 and ending at the end of a bottommost line. During this line and raster scanning period, the output beam is modulated in a preprogrammed manner based on the data to be recorded for exposing film 12 such that the latter displays the same data.

As shown in FIG. 1, linear beam scanning apparatus 10 includes an arrangement 12 for producing a fixed beam of collimated light 16 which is modulated in a preprogrammed way and in synchronism with the scan cycle of output beam 14, as will be seen. As arrangement 18 also comprising part of apparatus 10 acts on fixed beam 16 for producing therefrom a continuously arcuately scanning beam of light 20, that is a beam having a particular cross-sectional segment which repeatedly moves from a first point to a second point along an arcuate path generally indicated at 22 in FIG. 1. Still another arrangement 24 acts on the continously arcuately scanning beam of light 20 for producing therefrom a continuously linearly scanning beam of light 26, that is a beam having a particular cross-sectional segment which repeatedly moves from a first point to a second point along a straight line path, as best illustrated in FIG. 3 by the single line of movement 28.

It should be apparent from FIGS. 2 and 3 that the primary difference between light beams 14 and 26 is that output beam 14 can provide a plurality of scan lines 15 on a stationary film in a raster scanning fashion while beam 26 is only capable by itself of repeatedly providing a single scan line 28. Nevertheless, it should be equally apparent that beam 26 could serve to record data in the same manner as beam 14 if the film upon which the data are to be recorded is moved relative to incoming beam 26 so as to provide continuously spaced scan lines 28. However, in a preferred embodiment, overall apparatus 10 includes yet another arrangement 30 which acts on beam 26 for producing output beam 14.

Having described overall apparatus 10 including arrangements 12, 18, 24 and 30 generally, attention is now directed to a more detailed description of these arrangements starting with arrangement 12. As stated above, this latter arrangement is provided for producing a fixed beam of collimated light 16 which is line modulated in a preprogrammed way and in synchronism with the scanning of output beam 14. The necessary means for producing and modulating beam 16 may be conventionally or readily provided and its particular design will depend upon the ultimate use of apparatus 10. The way in which the modulation of beam 16 is synchronized with the line scanning of beam 14 is accomplished in accordance with the present invention and will be described hereinafter. In a preferred and actual working embodiment, a readily available HeNe or HeCd laser is utilized in conjunction with an acousto-optic modulator to produce a laser beam 32 of circular cross-section which converges to a point and which is modulated in a preprogrammed manner by suitable means such as a computer (not shown). A spatial filter 34 is located at the converging point of beam 32 in order to allow only the first order beam therethrough. This first order beam generally indicated at 36 is allowed to expand to a predetermined diameter. At this point, a cylindrical lens 38, having its focal point at the spatial filter 34, is provided for collimating beam 36 to provide previously recited beam 16 at the output of arrangement 12.

Attention is now directed to arrangement 18 which, as stated previously, acts on fixed beam 16 for producing therefrom a continuously arcuately scanning beam of light 20. While this may be accomplished in different ways without departing from certain aspects of the present invention, in accordance with a preferred embodiment, an uncomplicated flat scan disc with holographic grating facets generally indicated at 42 is utilized. This disc may be of any known type which when placed in a beam of light and rotated causes the latter to arcuately scan in the manner to be described. In a preferred embodiment of the present invention, the scan disc is a three-inch diameter by one-quarter inch thick glass plate 44, as seen best in FIG. 4 and it has a film of photoresist or other suitable light sensitive material 46 applied to its beam receiving surface. A grating pattern is photographed on the film in the form of a number of individual facets 50 equally spaced about the center of the disc and separated from one another by radial edges 51. The grating pattern is a simple parallel grating oriented on the disc in a fashion seen in FIG. 4.

In an actual embodiment disc 42 has a two and three-eighths inch diameter, ten facets, and each facet includes 457 parallel grating lines per millimeter. All ten facets are identical to one another and, as seen best in FIG. 4, the centermost grating line in each facet extends in the radial direction. In photoresist, the grating lines are caused by a surface relief pattern that is sinusoidal. The resulting surface relief pattern diffracts the incident laser beam so that it travels in a direction that lies in a plane that is perpendicular to the grating lines. The angle through which the beam is diffracted is a function of the number of grating lines per millimeter and the wave length of the impinging light. For 457 grating lines/mm the beam is deviated by an angle of 16.8 degrees from the normal (to the disc), for red light from a HeNe laser. The efficiency of the grating to deviate light from the zero order beam into the diffracted beam (1st order beam) depends on the way the grating pattern is formed in the film. In the surface relief gratings, as in photoresist or opaque gratings, the maximum efficiency obtainable is about 35%. For a thick, 5 mil coating of photopolymer materials such as that supplied by DuPont, it is possible to get 90% or better diffraction efficiency. This is due to the fact that the gratings in the thick photopolymer are represented by areas where the index of refraction of the material has changed due to exposure. The grating lines are preferably slanted in the film so as to obtain high Bragg angle diffraction efficiency.

Returning to FIG. 1, it can be seen that flat scan disc 42 is supported for rotation in a fixed plane by a suitable motor 52 which in a specific embodiment is a 16,000 rpm hystresis synchronous motor. In this actual embodiment, the outermost circumferential edge of disc 42 has been ground and polished and is supported by rotation by means of suitable air bearings (not shown). At the same time, the output shaft from motor 52 is connected to the disc for driving the latter by means of a flexible connecting device, such as a rubber shaft or small diameter steel wire, so that motor alignment errors and vibration will not be transferred to the disc. In another actual, preferred embodiment, disc 42 is cemented to a shaft which is supported within a precision bearing arrangement. The shaft itself is coupled to motor 52 by a flexible connecting device as above.

Having described flat scan disc and the way it is supported for rotation, attention is now directed to the way in which this disc converts the beam 16 into arcuately scanning beam 20. In order to accomplish this in a preferred manner, overall arrangement 18 includes a cylindrical lens 54 which is positioned in the path of beam 16 and which has its focal line in the plane of disc 42. In this regard, for purposes of description, the positional relationship of the various components thus far described and those to be described hereinafter will be placed in the consistent, x,y,z coordinate system found in FIG. 1 and some of the other figures. With this coordinate system in mind, it can be seen from FIGS. 1, 6 and 7 that beam 16 travels in a direction parallel to the y coordinate and that lens 54 acts on beam 16 to produce a beam 56, which converges vertically, that is in the xy plane (actually planes) as best seen in FIG. 6 while the same beam remains collimated in the yz plane (horizontally) as best seen in FIG. 7.

Figures 7, 8:
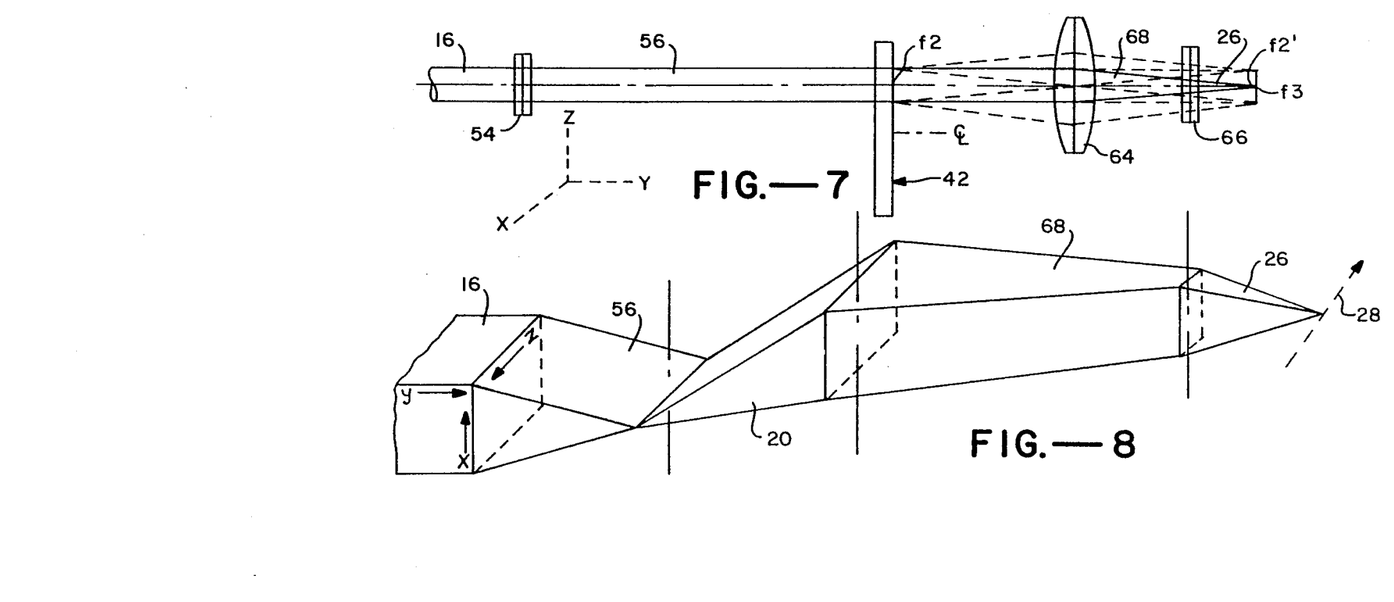
FIG. 7 is a diagrammatic illustration similar to FIG. 6 but in top view.
FIG. 8 is a further diagrammatic illustration, in perspective view, of the way in which a part of the apparatus of FIG. 1 operates optically.

In order to more fully appreciate the way in which the various beams are acted upon optically, the perspective view of FIG. 8 has been provided. In this perspective view, the beam has been shown as having a square cross-sectional configuration, although this is only for illustrative purposes. Nevertheless, it can be seen how lens 54 produces beam 56 from beam 16. The way in which apparatus 10 produces many of its other beams (to be discussed) will also be simplified in FIG. 8.

Figure 6:
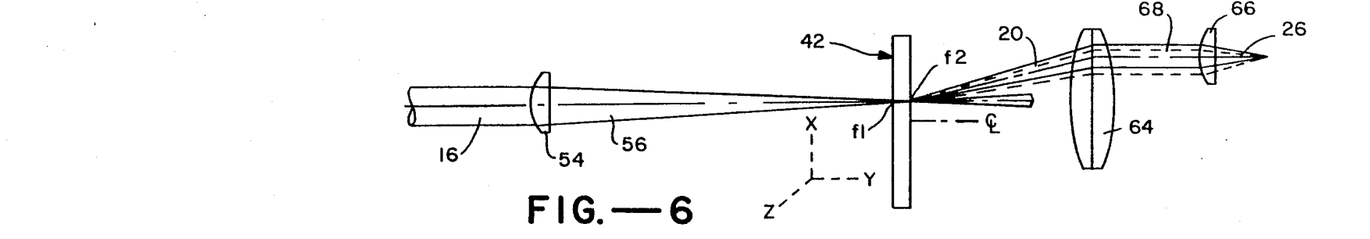
FIG. 6 is a diagrammatic illustration in side view of the way in which a part of the apparatus in FIG. 1 functions optically.

Returning to FIGS. 1 and 4 in conjunction with FIG. 6, it can be readily seen that line 58 of converging beam 56 lies on the plane of disc 42. In a preferred and actual working embodiment, beam 56 is normal to the plane of disc 42 and impinges on the latter such that line 58 extends in the radial direction of the disc. At the same time, the various facets 50 recited above are spaced from one another by means of relatively thin, radially extending lines defined by adjacent radial edges 51. In this way, the time it takes for beam line 58 to pass from one facet to the next during the rotation of disc 42 is minimized which means that the transition time the beam is between two adjacent facets is minimized and quite small in comparison to the time it is fully within the given facet.

As stated previously, disc 42 during rotation acts on beam 56 for producing continuously arcuately scanning beam 20. This latter beam begins to expand back into a circle as it extends rearwardly of disc 42. The arcuate manner in which this beam scans is best illustrated in FIGS. 4 and 5. In FIG. 4, the incoming beam 56 is shown along with the positive and negative first order diffracted beams and the zero order diffracted beams (only in dotted lines). Only the first order diffracted beams are of interest here. As the disc 50 rotates in the clockwise direction, as viewed in FIG. 4, the first order beam is caused to move along the arcuate path 60 from an initial point at the beginning of any given facet to an ending point at the end of the same facet. This procedure repeats itself for the next facet, and so on. As the beam 20 scans the arcuate path 60, it should be noted that its cross-sectional configuration (generally elliptical with the minor axis in the x direction) indicated at 22 remains at the same orientation during the arcuate scan with respect to either line 58 or the fixed x,y,z coordinate system. This is best seen in FIG. 5.

Attention is now directed to arrangement 24 which, as stated previously, acts on continuously arcuately scanning beam of light 20 for ultimately producing therefrom continuously linearly scanning beam of light 26. This is accomplished utilizing two lenses, a spherical lens 64 and a cylindrical lens 66. As best seen in FIGS. 6 and 7 in conjunction with FIG. 1, spherical lens 64 is positioned in co-axial relationship with beam 56 behind disc 42 so that one of its focal points f2 is located at the backside of the disc in the center of beam 20. Its other focal point f2' is located in a predetermined plane including the converged point of beam 26, as will be seen. Spherical lens 64 is positioned in this manner by suitable means (not shown) and acts on beam 20 to collimate the latter in the xy plane (vertically) while causing it to converge in the yz plane (horizontally) to its focal point f2', as best seen in FIG. 8. This resultant combination collimated and converging beam section is generally indicated at 68.

Lens 66 is a cylindrical lens fixedly supported by suitable means (not shown) on the center line of beam 68 when the latter is in its central scan position, and between lens 64 and focal point f2'. Lens 66 has its own focal line f3 parallel with the z-axis at focal point f2' such that the latter is centrally located upon focal line f3. With lens 66 positioned in this manner, it does not act on beam section 68 at all in the yz plane (or planes parallel thereto) so that the beam is allowed to converge in these planes. However, the collimated light in xy plane (and parallel planes) from beam section 68 are caused to converge to the focal line f3 resulting in beam 26 converging to a point. The combination of lens 64 and 66 confines movement of the converging point of beam 26 to the focal line f3, that is each time beam 20 scans arc 60, beam 20 scans focal line f3. This scan line is shown in FIG. 3 at 28, as discussed previously.

As also discussed previously, beam 26 could be used for recording data by merely moving the film relative to scan line 28. Whether or not this is done in lieu of raster scanning arrangement 30, it is necessary to synchronize the preprogrammed modulation of the beam with the way in which it scans so as to properly locate the recorded data on the film. In accordance with the present invention, this is accomplishd by locating suitable light sensing means in an appropriate position relative to the movement of beam 26 so as to sense each time the beam is in a certain position along its scanning path. Once this position is sensed, it can be used to control exactly when and how the beam is modulated by suitable and readily providable means interconnecting the sensor with the beam modulator and modulating program. In a particular embodiment a small mirror 70 is positioned at the beginning of scan line 28, and reflects the impinging beam upon a very narrow slit mask 72 placed in front of a photo-detector generally indicated at 74. The mirror and slit are arranged such that the beam 26 is focused on the plane of the slit. As the beam starts to scan the line 28, it abruptly passes through the narrow slit triggering a start-of-line signal used to synchronize the beam modulation with the scan cycle. In a preferred embodiment the mirror and slit are replaced with a single strand of fiber optics. The narrow diameter of the fiber strand serves as a small window similar to the action of the slit and the end of the fiber is accurately positioned in the plane of scan line 28. The other end of the fiber is attached directly to a detector, for example detector 74, for obtaining maximum optical coupling efficiency.

Figure 9:
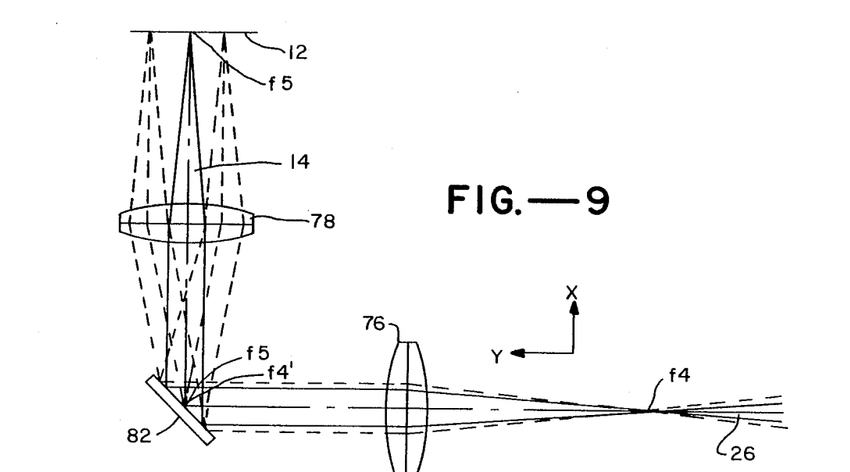
FIGS. 9-11 are diagrammatic illustrations in side view, top view and end view, respectively, of the way in which a second portion of the apparatus of FIG. 1 operates optically.
Figure 10:
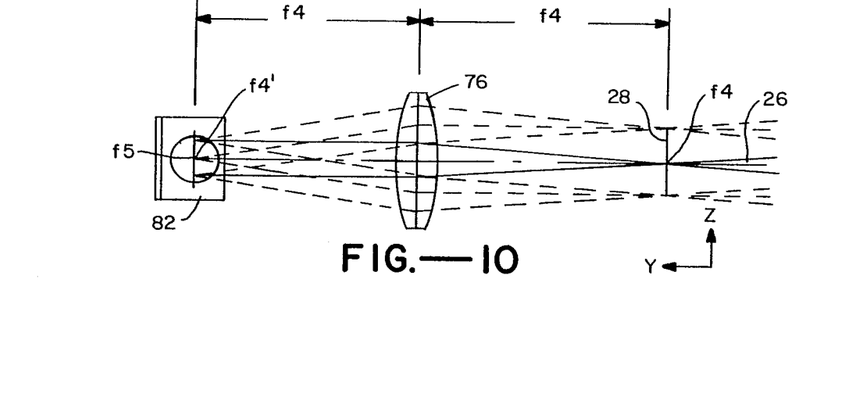
Figure 11:
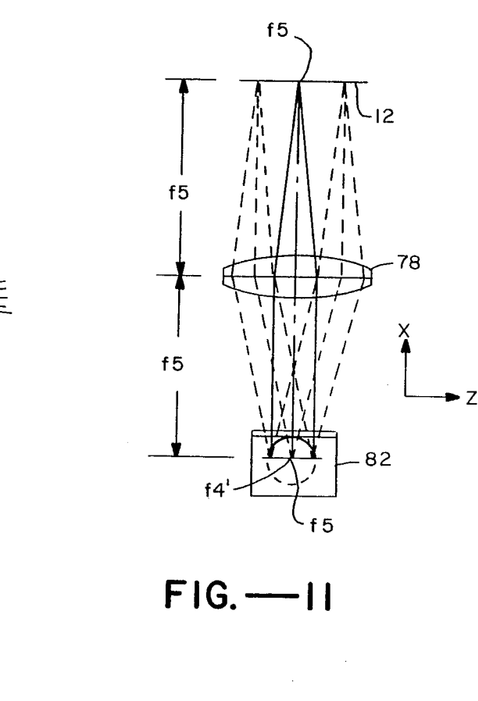

Having described the way in which apparatus 10 functions to provide continuously linearly scanning beam 26, attention is now directed to arrangement 30 which, as stated previously, ultimately provides line and raster scanning beam 14. In order to accomplish this, arrangement 30 includes spherical lenses 76 and 78 in conjunction with a galvonometer 80. As best seen in FIGS. 9 and 10, lens 76 has one focal point f4 centrally located on scan line 28 and a second focal point f4' located at the center of mirror 82 comprising part of galvonometer 80. Lens 78 has its focal axis normal to the focal axis of lens 76 and has a first focal point f5 at the focal point f4' on mirror 82 and a second focal point f5' in the plane of film 12. Lenses 76 and 78 essentially work together to form a transfer lens, that is they transfer the scan line 28 to the plane of film 12. Because beam 26 scans line 28 while always remaining normal thereto, that is telecentric to the scan line, beam 14 is also telecentric with respect to the film 12 at all points along scan lines 15.

In order to obtain raster scanning, galvonometer 80 causes mirror 82 to pivot back and forth from one extreme position to another sufficient to move beam 26 normal to scan lines 15 from the top of film 12 to its bottom. In order to best accommodate the action of the galvonometer, the lens 76 has been selected so that the beam between this lens and lens 78 is collimated in the xy planes (FIG. 9). With the beam collimated in this manner and with lens 78 positioned in the manner shown, that is with its focal point f5 at mirror 82, the raster scan is also telecentric, that is the final recording beam 14 is not only focused in the film plane but it is also always perpendicular to the film plane regardless of its linear or raster scanning position. This is to be contrasted with prior art arrangements which utilize two galvonometer mirrors. Since only one of these mirrors can be the focal distance from the final lens, telecentric scanning can be achieved only horizontally or vertically, but not both. The result is that the image, unless corrected, shows some degree of keystoning or distortion.

Figure 12:
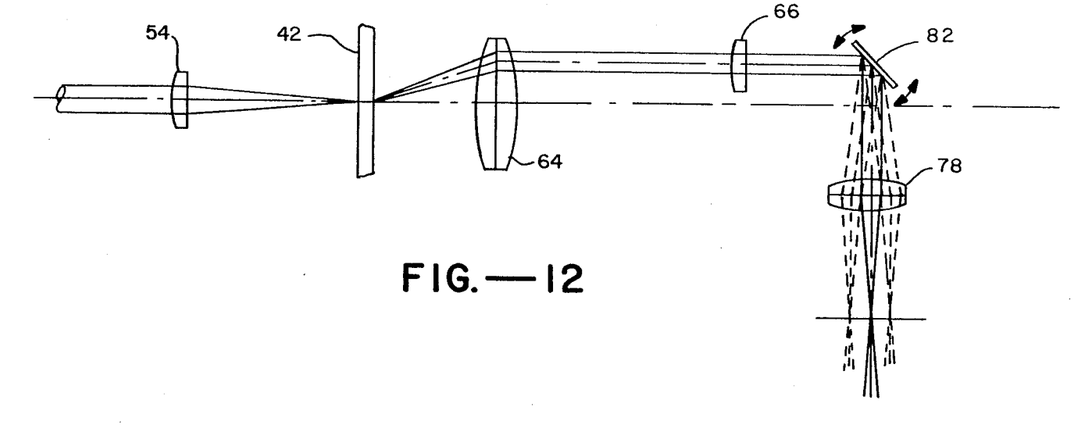
FIGS. 12 and 13 are diagrammatic illustrations in top view and side view, respectively, of the way in which a modified linear scanning apparatus functions optically.
Figure 13:
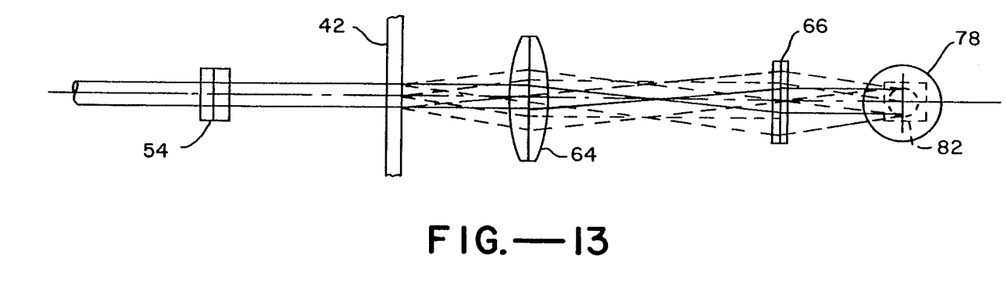

Referring to FIGS. 12 and 13, a modified line scanning apparatus 10' is shown. This apparatus is identical to apparatus 10 with one exception. Lens 66 is positioned on the far side of the back focal plane of lens 64 rather than in front of it. This eliminates the need for lens 76 while the final scanned foremat on film 12 remains the same as in apparatus 10. However, it should be obvious that this latter arrangement also eliminates the linearly scanning beam 26 and hence line sensor 74.

What is claimed is:

1. A linear beam scanning apparatus comprising:
   (a) means for providing a source of light;
   (b) means cooperating with said source for producing therefrom a stationary beam of light along a fixed path, said beam producing means including means for causng said stationary beam to converge to a line in a predetermined plane;
   (c) means acting on said stationary beam for producing therefrom a first continuously arcuately scanning beam of light having a particular cross-sectional segment thereof which repeatedly moves from a first point to a second point along an arcuate path in a predetermined plane, said arcuately scanning beam producing means including a flat disc for supporting at least one holographic grating facet and means for supporting said disc for rotation in said predetermined plane and in the path of said stationary beam such that the latter impinges on and is diffracted by said grating facet for producing said continuously arcuately scanning beam; and
   (d) means acting on said first arcuately scanning beam for producing therefrom a second continuously linearly scanning beam of light having a particular cross-sectional segment thereof which repeatedly moves from a first point to a second point along a straight-line path in a second, predetermined plane.

2. An apparatus according to claim 1 wherein said light source producing means includes means for modulating said source of light in a predetermined way during each scan of said output beam for the purpose of recording data on light-sensitive film, said modulating means including means located in a fixed position relative to and in optical alignment with a predetermined sensing point on said straight line path for sensing each time said particular segment of said output beam is at said sensing point whereby to synchronize the modulation of said light source with the scanning of said output beam.

3. An apparatus according to claim 1 wherein said sensing means includes an optical fiber positioned to receive light from said output beam when said particular cross-sectional segment of the latter is at said sensing point and wherein said sensing point is in at least close proximity to said first or second points on said straight line path.

4. An apparatus according to claim 1 including means acting on said arcuately scanning beam for producing a combination line and raster scanning output beam of light having a particular cross-sectional segment thereof which successively and repeatedly moves across a plurality of parallel, spaced apart straight line paths aligned with one another in a given output plane, starting at a given end of a given straight line path.

5. An apparatus according to claim 4 wherein said linearly scanning beam producing means and said output beam producing means together include means for maintaining the output beam axis perpendicular to said output plane at all times during the scanning of said output beam.

6. An apparatus according to claim 1 wherein said disc supports a plurality of holographic grating facets equally spaced around the center of said disc and separated from one another along radial lines from the center of said disc and wherein the converging line of said stationary beam is located in a radial direction relative to the center of said disc.

7. A linear beam scanning apparatus, comprising:
(a) first means for providing a source of light;
(b) second means cooperating with said light source for producing therefrom a stationary beam of light;
(c) third means acting on said stationary beam for producing therefrom a continuously arcuately scanning beam of light having a particular cross-sectional segment thereof which repeatedly moves from a first point to a second point along an arcuate path in a fixed scanning plane, said third means including
 (i) a flat disc for supporting a plurality of holographic grating facets spaced from one another around the center of said disc, and
 (ii) means supporting said disc for rotation in a fixed plane through said stationary beam such that the latter impinges on and is diffracted by said facets one at a time during rotation of said disc for producing said arcuately scanning beam; and
(d) means acting on said arcuately scanning beam for producing therefrom a second continuously linearly scanning output beam of light having a particular cross-sectional segment thereof which repeatedly moves from a first point to a second point along a straight line path in a second fixed scanning plane.

8. A linear beam scanning apparatus, comprising:
(a) first means for providing a source of light;
(b) second means cooperating with said light source for producing therefrom a collimated beam of light;
(c) third means acting on said collimated beam for producing therefrom a beam of light which converges to a line in a first fixed plane;
(d) fourth means acting on said converging beam for producing therefrom a continuously arcuately scanning beam of light having a particular cross-sectional segment thereof which repeatedly moves from a first point to a second point along an arcuate path in a second fixed scanning plane, said fourth means including
 (i) a flat disc for supporting a plurality of holographic grating facets equally spaced around the center of said disc and separated from one another along radial lines from the center of said disc, and
 (ii) means supporting said disc for rotation in said first fixed plane and in the path of said converging beam such that the latter impinges on and is diffracted by said facets, one at a time, during rotation of said disc for producing said arcuately scanning beam; and
(e) means acting on said first-mentioned continuously linearly scanning beam for producing therefrom a continuously scanning output beam of light having a particularly cross-sectional segment thereof which repeatedly moves from a first point to a second point along a straight line path in a third fixed plane.

9. An apparatus according to claim 8 wherein said disc is positioned such that said converging line of light from said converging beam is located in a radial direction in said first fixed plane relative to the center of said disc.

10. A linear beam scanning apparatus, comprising:
(a) first means for providing a source of light;
(b) second means cooperating with said light source for producing therefrom a collimated beam of light;
(c) third means acting on said collimated beam for producing therefrom a beam of light which converges inward to a line in a first fixed plane;
(d) fourth means acting on said converging beam for producing therefrom a continuously arcuately scanning beam of light which diverges outwardly from said line and which extends at an incline with said straight beam, said arcuately scanning beam having a particular cross-sectional segment thereof which repeatedly moves from a first point to a second point along an arcuate path in a second fixed plane while remaining at a fixed orientation relative to the horizontal, said fourth means including
 (i) a flat disc for supporting a plurality of holographic grating facets equally spaced around the center of said disc and separated from one another along radial lines from the center of said disc, and
 (ii) means supporting said disc for rotation in said first plane and in the path of said converging beam such that the latter impinges on and is diffracted by said facets, one at a time, during rotation of said disc for producing said arcuately scanning beam and such that said arcuately scanning beam diverges outwardly from said converging line at said disc; and (e) means acting on said arcuately scanning beam for producing therefrom a continuously linearly scanning beam of light which converges to a point that repeatedly moves from the beginning of a straight line path to the end thereof in a third, fixed plane, said means for producing said linearly scanning beam including
  (i) first means located at said second fixed plane and acting on said arcuately scanning beam for collimating the latter in a first direction and causing it, at the same time, to converge inwardly in a second direction normal to said first direction, and
  (ii) second means located between said second and third fixed planes and acting on the collimated and converging beam for causing the latter to converge in said first direction.

11. A linear beam scanning apparatus especially suitable for recording data on light sensitive film, said apparatus comprising:

(a) first means for providing a collimated beam of light;

(b) second means including a fixedly supported cylindrical lens having a focusing axis and a focal line located in a first plane normal to said focusing axis, said cylindrical lens acting on said collimated beam for producing therefrom a beam of light which extends along said focusing axis and which converges inwardly to a line at its focal line;

(c) third means acting on said converging beam for producing therefrom a diverging, continuously arcuately scanning beam of light extending at an angle with said focusing axis and having a particular cross-sectional segment thereof which repeatedly moves from a first point to a second point along an arcuate path in a second scanning plane, said third means including
  (i) a flat disc for supporting a plurality of holographic grating facets equally spaced around the center of said disc and separated from one another along radial lines from the center of said disc, and
  (ii) means supporting said disc for rotation in said first plane and in the path of said converging beam such that the latter impinges on and is diffracted by said facets, one at a time, during rotation of said disc for producing said scanning beam and such that the scanning beam diverges outwardly from said converging line at said disc;

(d) fourth means acting on said arcuately scanning beam for producing therefrom a continuously linearly scanning beam of light which converges to a point that repeatedly moves from one end of a straight line path to an opposite end thereof in a third plane, said fourth means including
  (i) means including a fixedly supported spherical lens located in said second plane for intercepting said arcuately scanning beam and having a focusing axis and first and second focal points on opposite sides thereof, said first focal point being located at the center of said disc and said second focal point being located at said third plane, and
  (ii) means including a fixedly supported cylindrical lens which is located between said spherical lens and said third plane and which has a focal line on said third plane coincident with and extending at least the length of said straight line path; and (e) means for modulating said first mentioned collimated beam of light in a predetermined way and in predetermined synchronism with the scanning movement of said arcuately scanning beam for recording data on light sensitive film.

12. An apparatus according to claim 11 wherein said modulating means includes means located in a fixed position relative to and in optical alignment with a predetermined sensing point on said straight line path sensing each time said point of said second scanning beam is at said sensing point whereby to synchronize the modulation of said collimated beam with the scanning of said beam point.

13. An apparatus according to claim 12 wherein said sensing means includes an optical fiber positioned to receive light from said second scanning beam when the beam point of the latter is at said sensing point and wherein said sensing point is in at least close proximity to either of the opposite ends of said straight line path.

14. An apparatus according to claim 11 including means acting on said arcuately scanning beam for producing a combination line and raster scanning beam of light having a particular cross-sectional segment thereof which successively and repeatedly moves across a plurality of parallel, spaced apart straight line paths in a given plane through said combination beam, starting at a given end of a given straight line path.

15. An apparatus according to claim 14 wherein said fourth beam means and said combination beam producing means together include means for maintaining said combination beam perpendicular to the last-mentioned given plane at all times during the scanning of said combination beam.

* * * * *